United States Patent [19]
Wells

[11] Patent Number: 5,273,300
[45] Date of Patent: Dec. 28, 1993

[54] TOY VEHICLE PROPELLED BY PUSH OR PEDAL POWER WITH RETRACTABLE PEDALS

[75] Inventor: Harold S. Wells, Huntington, N.Y.

[73] Assignee: Toying Around, Inc., Huntington, N.Y.

[21] Appl. No.: 883,132

[22] Filed: May 14, 1992

[51] Int. Cl.⁵ .................. B62M 1/02; B62K 9/00; G05G 1/14
[52] U.S. Cl. .................. 280/259; 280/282; 280/7.15; 74/594.7
[58] Field of Search .......... 280/259, 282, 267, 7.17, 280/7.15, 7.16, 87.05, 1.188; 74/594.7, 547; 301/2.5

[56] References Cited

U.S. PATENT DOCUMENTS

| | | | |
|---|---|---|---|
| 1,286,539 | 12/1918 | Colon | 280/282 X |
| 1,333,292 | 3/1920 | Case | 280/259 |
| 2,468,532 | 4/1949 | Wolfe | 280/7.17 X |
| 2,536,466 | 1/1951 | Rippenbein | 74/594.7 |
| 2,620,682 | 12/1952 | Perrot | 74/547 |
| 3,422,701 | 1/1969 | Boisis | 74/594.7 |
| 3,827,719 | 8/1974 | Lohr et al. | 280/259 |
| 3,858,823 | 1/1975 | Quenot | 74/547 |
| 4,335,899 | 1/1982 | Hiscock | 280/259 |
| 4,344,655 | 8/1982 | Pellegrino | 301/2.5 |

*Primary Examiner*—Margaret A. Focarino
*Assistant Examiner*—Peter English
*Attorney, Agent, or Firm*—Gerard F. Dunne

[57] ABSTRACT

A toy vehicle for a child has a frame having at least one front wheel mounted to a forward portion with real wheels mounted on a rearward portion of the frame. The front and rear wheels are adapted to engage a support surface, such as a floor, and a seat is mounted to the frame between the front and rear wheels at a height enabling a young child to propel the vehicle when seated on the seat by engagement of the support surface with the feet of the young child. Retractable foot pedals extend laterally from respective sides of the front wheels of the device and the pedals are retracted to enable the young child to either propel the vehicle by pedaling, or for enabling the child to propel the vehicle by pushing against the support surface with the pedals in the retracted position.

2 Claims, 2 Drawing Sheets

5,273,300

TOY VEHICLE PROPELLED BY PUSH OR PEDAL POWER WITH RETRACTABLE PEDALS

FIELD OF THE INVENTION

The present invention relates to a toy vehicle which can be ridden by a young child and propelled by either pushing with the child's feet or actuation of pedals.

BACKGROUND OF THE INVENTION

Toy vehicles known as ride-ons for young children, such as toddlers, are known. Typically, young children do not have the dexterity to actuate the pedals normally provided on a standard tricycle, and very often the first ride-on provided to a young child does not have pedals but, instead, the child can propel the vehicle by pushing his or her feet against the floor. As the child gains strength and dexterity, the child is normally progressed to another vehicle such as a tricycle containing pedals. This requires the purchase of a separate toy vehicle for the child, and often the transition for a young child from the push-powered to a pedal-powered vehicle is difficult.

It is, therefore, an object of the present invention to provide a toy vehicle for young children such as toddlers which can be propelled in the standard manner by push power and, additionally, may be alternatively powered by use of pedals standard for a tricycle. In this way, a child can not only develop at his or her own pace from a push-powered to a pedal-powered vehicle, but also only a single vehicle need be acquired for the child in order to instruct the child in the transition from push-powered towards a pedal-powered toy vehicle.

SUMMARY OF THE PRESENT INVENTION

According to the present invention, a toy vehicle is provided for a young child and includes a frame having at least one front wheel mounted to a forward portion for engaging a support surface, such as a floor. Additionally, rear wheels are mounted on a rearward portion of the frame to engage the support surface, and a seat is mounted to the frame between the front and rear wheels at a height enabling a young child to propel the toy vehicle while seated on the seat by engagement of the support surface with the feet of the young child. Importantly, means are provided for selectively enabling the young child to power the toy vehicle by pedaling, and these means include retractable foot pedals extending laterally from respective sides of the at least one front wheel.

In the preferred embodiment of the present invention, two front wheels are provided on respective sides of a steering mechanism for increased stability. A respective pedal is provided retractively from each of the front wheels. The preferred embodiment of the present invention would include a respective recess on the front wheels to receive a respective pedal. A pivot mechanism is provided to enable the foot pedals to be pivoted and held within a recess when the toy vehicle is desired to be used by the child simply by pushing with the feet against a support surface.

These and other objects, advantages and features of the present invention will become apparent from a review of the detailed description of the preferred embodiment of the invention, and a review of the accompanying drawings.

DETAILED DESCRIPTION OF THE PREFERRED EMBODIMENT

Figure 1:
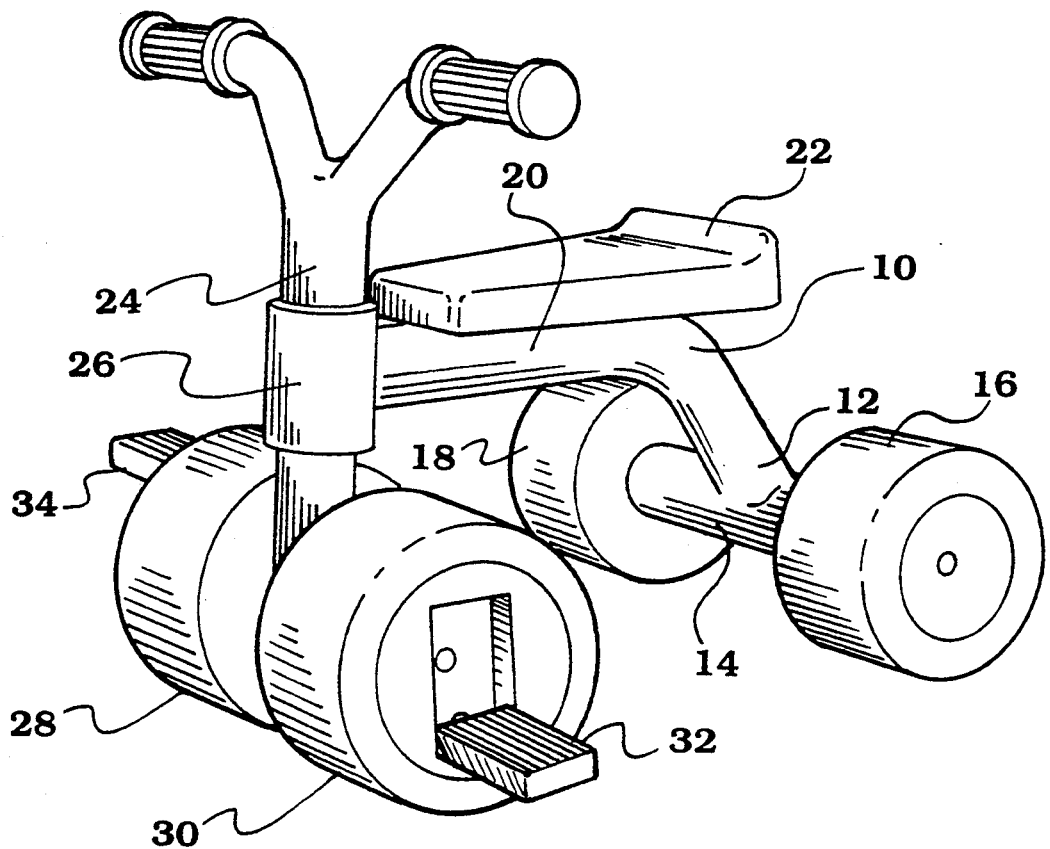
FIG. 1 is a perspective view of a toy vehicle according to the present invention.

FIG. 1 illustrates a toy vehicle of the present invention, and includes a frame 10 illustrated in generally tubular form and having a rear connector 12 having a lateral journal 14 for receiving the axle of rear wheels 16 and 18.

The frame 10 has a lateral mid portion 20 securely receiving a child's seat 22. The mid portion of the frame extends to a vertical steering mechanism 24 journaled within housing 26 therefor. The steering mechanism 24 extends downwardly from the housing 26 to provide a journaled connector such as connector 14 for receiving the front axle supporting wheels 28 and 30. In the preferred form of the present invention, respective front wheels 28 and 30 are provided on respective lateral sides of the steering mechanism 24 to enhance stability.

Figures 3, 4:
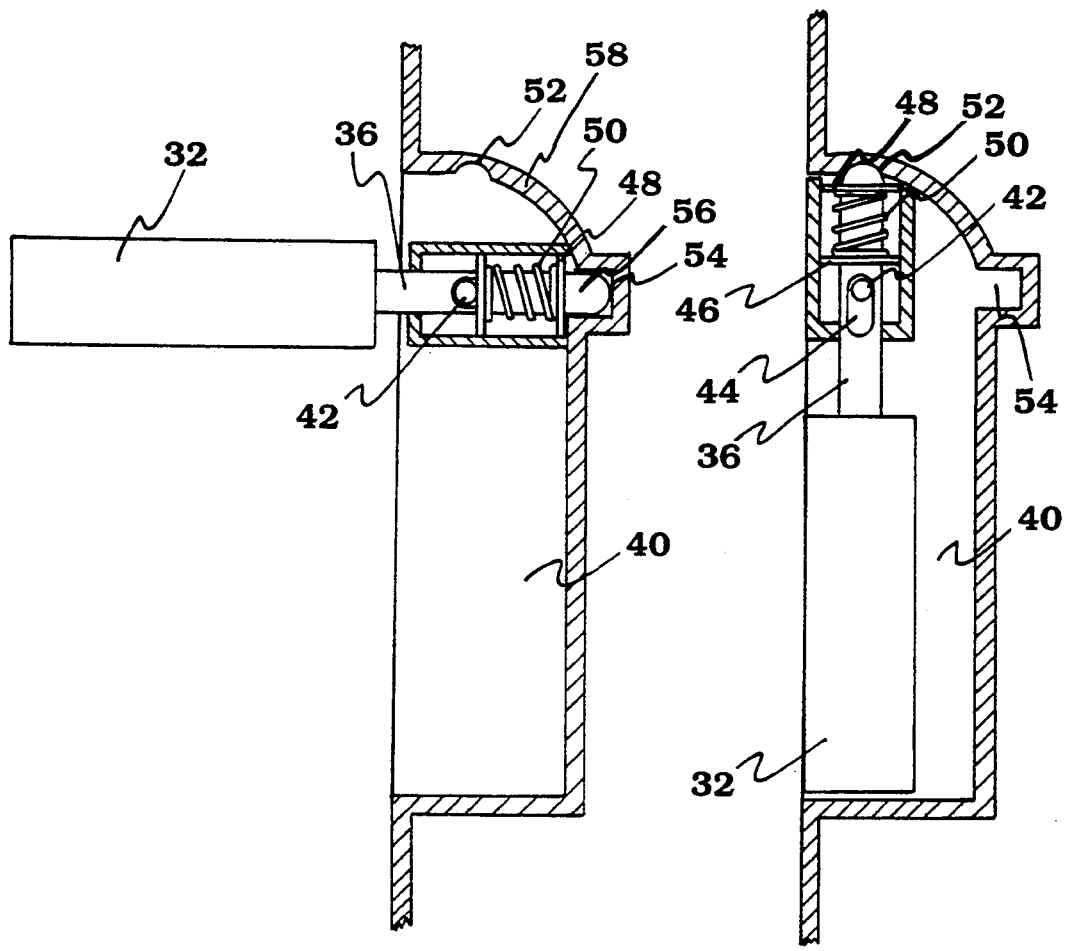
FIG. 3 is a schematic illustration of one mechanism for providing the retractable pedals, with the illustrated pedal being in the laterally-extended position.
FIG. 4 is comparable to FIG. 3, but illustrates the pedal in its retracted position.

As illustrated in the schematic illustrations of FIGS. 3 and 4, the front wheels have respective pedals 32 and 34 which extend laterally from the respective front wheels, and are retractable to lie flush within respective recesses.

Figure 2:
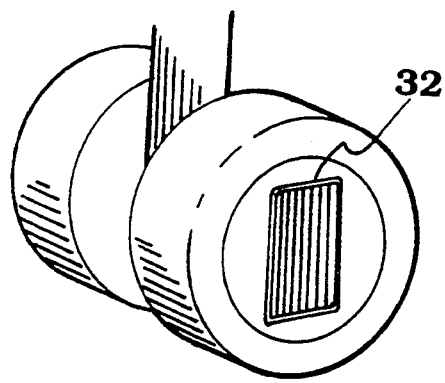
FIG. 2 is a schematic illustration of the front wheels of the preferred embodiment of the present invention.

FIG. 1 illustrates the pedals in the extended position enabling the child to pedal the vehicle, and FIG. 2 illustrates the pedal 32 in its retracted position in the recess of the front wheel.

As illustrated in FIG. 3, a pedal 32 is supported rotatively on shaft 36 held to tubular support 38. Shaft 36 is mounted to the respective front wheel by a pivot shaft 42 held within an elongate slot 44 of the shaft 36.

Held securely to the shaft 36 are spaced retainers 46 and 48 securing a coiled compression spring 50 therebetween.

The side wall of the recess 40 includes detent 52 and locking recess 54 as illustrated in FIGS. 3 and 4. FIG. 3 illustrates the pedal 32 in its laterally-extended position enabling operation by the child to pedal the vehicle, and the free end 56 of the shaft 36 is fitted within the locking recess 54 to hold the pedal 32 in its laterally-extended position. In order to retract the pedal 32, the pedal 32 can be pulled outwardly against the resiliency of the spring 50 to release the end 56 from the locking recess 54. In this way, the pedal 32 can be pivoted about shaft 42 into recess 40, and the end 56 will ride along the curved end wall 58 of the recess 40 until the end 56 aligns with the detent 52. At this time, the pedal under the resiliency of the spring 50 will slide forwardly to hold the end 56 within the detent 52, and the pedal can be received within the recess 40 as illustrated in FIG. 4.

To retract the pedal, it is engaged and pulled outwardly to enable the pedal to pivot about the shaft 42, and the end 56 will slide along the curved end wall 58 until the end 56 is re-aligned with the locking recess 54, at which time the end 56 will snap within the locking recess to hold the pedal firmly in position.

It is believed, therefore, that a toy vehicle has been provided which can be used by a small child either with the pedals retracted into the front wheels so that the child can propel the vehicle by pushing his or her feet along the floor supporting the vehicle, or alternatively, the pedals can be retracted from their withdrawn position to enable the child to pedal the toy vehicle in the manner of a standard tricycle. In view of the retractable nature of the pedals, the pedals can be retracted to enable the child to power the vehicle by push power until enough strength and dexterity have been provided through intermittent use of the pedals to enable the child to pedal the vehicle in the normal manner of a tricycle.

I described my invention in reference to the detailed embodiment illustrated in the accompanying drawings, but the scope of my invention is not intended to be defined by the details described above, but as set forth in the appended claims.

I claim:

1. A toy vehicle for a young child, comprising a frame having at least one front wheel mounted to a forward portion thereof for engaging a support surface and rear wheels mounted on a rearward portion thereof for engaging said support surface, a seat mounted to said frame between said front and rear wheels enabling a young child to propel the toy vehicle when seated on said seat by engagement of said support surface with the feet of the young child, and means for selectively enabling the young child to propel the vehicle by pedaling, said means including retractable foot pedals extending laterally from respective sides of said at least one front wheel, said means for each said front wheel including a respective recess within each said wheel to receive a respective foot pedal, and means enabling each said foot pedal to be pivoted into and held within said respective recess.

2. A toy vehicle as set forth in claim 1, including two front wheels mounted with a central steering mechanism therebetween with each of said front wheels having a respective foot pedal extending laterally therefrom.

* * * * *